United States Patent
Ootani et al.

(10) Patent No.: US 7,279,878 B2
(45) Date of Patent: Oct. 9, 2007

(54) OUTPUT REGULATING DEVICE FOR REGULATING OUTPUT OF ELECTRIC POWER SOURCE DEPENDING ON INPUT THEREFROM

(75) Inventors: Mitsuaki Ootani, Nakamuroda Haruna-Machi (JP); Yasuo Hosaka, Nakamuroda Haruna-Machi (JP)

(73) Assignee: Taiyo Yuden Co., Ltd., Tokyo (JP)

( * ) Notice: Subject to any disclaimer, the term of this patent is extended or adjusted under 35 U.S.C. 154(b) by 0 days.

(21) Appl. No.: 10/933,796

(22) Filed: Sep. 3, 2004

(65) Prior Publication Data

US 2005/0052222 A1 Mar. 10, 2005

(30) Foreign Application Priority Data

Sep. 4, 2003 (JP) .............................. 2003-312791

(51) Int. Cl.
  *G05F 1/10* (2006.01)
  *G05F 5/00* (2006.01)
(52) U.S. Cl. .................. 323/285; 323/222; 323/299
(58) Field of Classification Search ................ 323/299, 323/222, 285; 307/150
See application file for complete search history.

(56) References Cited

U.S. PATENT DOCUMENTS

| | | | | |
|---|---|---|---|---|
| 4,580,090 A | * | 4/1986 | Bailey et al. ................ 323/303 |
| 4,719,552 A | * | 1/1988 | Albach et al. ................ 363/44 |
| 4,731,574 A | * | 3/1988 | Melbert ....................... 323/275 |
| 5,493,204 A | | 2/1996 | Caldwell |
| 5,736,832 A | * | 4/1998 | Seragnoli ..................... 320/128 |
| 5,847,549 A | | 12/1998 | Dodson, III |
| 6,198,639 B1 | * | 3/2001 | Wolfgart et al. ......... 363/21.15 |
| 6,522,114 B1 | * | 2/2003 | Bakker et al. .............. 323/282 |
| 6,590,370 B1 | | 7/2003 | Leach |
| 6,936,997 B2 | * | 8/2005 | Mullett ........................ 323/222 |

FOREIGN PATENT DOCUMENTS

| JP | 10-284102 | 10/1998 |
|---|---|---|
| JP | 11-144749 | 5/1999 |

\* cited by examiner

Primary Examiner—Shawn Riley
(74) Attorney, Agent, or Firm—Knobbe Martens Olson & Bear, LLP

(57) ABSTRACT

If an input voltage to an output control device is above a lower limit value, the output control device operates in a constant voltage control mode for maintaining an output voltage at a substantially constant voltage. If the input voltage of the output control device falls below the lower limit value, the output voltage is controlled to be lower than the constant voltage in the constant voltage control mode, and the output control device operates in a lower limit value sustaining mode for maintaining the input voltage at the lower limit value. Then, the output control device shifts to a current increasing mode in which the output current rises as the output voltage falls.

19 Claims, 8 Drawing Sheets

OUTPUT REGULATING DEVICE FOR REGULATING OUTPUT OF ELECTRIC POWER SOURCE DEPENDING ON INPUT THEREFROM

BACKGROUND OF THE INVENTION

1. Field of the Invention

The present invention relates to an output control device for an electric power source, having a converter circuit for converting an input voltage from the electric power source to an output voltage and, in particular, to an output control device for protecting an electric power source by preventing malfunction due to a sharp drop in the input voltage from the electric power source having a relatively large internal impedance.

2. Description of the Related Art

Output control device control an input from an electric power source such as a fuel cell with a switching power supply circuit thereof, thereby controlling an output to a load. Known output control device typically include an output short-circuit protective circuit, an output excessive current protective circuit, or an input excessive voltage protective circuit, etc.

These protective circuits protect the switching power supply circuit, or a circuit, electrical components, and devices connected thereto as a load, but does not protect the electric power source.

The output short protective circuit and the output excessive current protective circuit limit input power from the electric power source, namely, these protective circuits limit the input power to the switching supply circuit. The level of protection provided by the protective circuit for protecting the electric power source is not satisfactory because the precision of the circuit for limiting power is poor, and because the protective circuit does not monitor directly an input voltage Vin and an input current Iin.

Japanese Patent Application Publications Nos. 10-284102 and 11-144749 disclose techniques for protecting an electric power source such as a fuel cell.

According to Japanese Patent Application Publication No. 10-284102, a function generator is arranged to input an output command to an inverter to set an upper limit value of a direct current responsive to the output command. A direct current detector is arranged to detect a direct current supplied from a fuel cell to the inverter. The inverter is controlled so that the direct current value detected by the director current detector does not exceed the upper limit value of the direct current from the function generator.

According to Japanese Patent Application Publication No. 11-144749, a second voltage value, higher than a first voltage value set for stopping an abnormal operation of a fuel cell, is set to monitor the voltage of the fuel cell. If the voltage of the fuel cell reaches the second voltage value, an input current to a power adjuster is gradually lowered.

In accordance with the disclosed techniques, if the input current to the inverter or the power adjuster is lowered, the input voltage thereto rises. As a result, the output current falls resulting in the output power being insufficient to drive a load.

Generally speaking, if an output current or an output power increases in an electric power source, such as a fuel cell having a relatively high internal impedance, the output voltage of the electric power source falls due to a voltage drop across the internal impedance.

An output control device is typically used to control the output of the electric power source. The electric power source switches the output voltage of a electric power source such as a fuel cell before providing the output to a load. As an output current Iout output from the output control device to the load increases, an output current of the electric power source, namely, an input current Iin to the output control device can rise above a predetermined value. If the input current Iin rises above the predetermined value, an output voltage of the electric power source, namely, an input voltage Vin to the output control device is lowered, leading to a positive feedback operation in which the input current Iin to the output control device further increases while the input voltage Vin further decreases. As a result, an input voltage Vin continuously decreases, and the output control device is unable to maintain the output voltage Vout at a desired value.

More specifically, when the output current Iout is low, the input current Iin is also low, and therefore the input voltage Vin is high. Under this condition, variations in the input current Iin and the input voltage Vin due to a variation in the output current Iout are small.

However, a high output current Iout causes a high input current Iin, leading to a low input voltage Vin. Under this condition, variations in the input current Iin and the input voltage Vin due to a variation in the output current Iout becomes large.

In other words, variations in the input current Iin and the input voltage Vin gradually become large as the output current Iout rises. If the magnitude of the variations rises above a value unique to a switching power supply, a positive feedback chain of a rise in the input current Iin→a fall in the input voltage Vin→a rise in the input current Iin takes place. As a result, the input voltage Vin sharply drops, damaging the electric power source and leading to the output of insufficient power to a connected load.

Such a malfunction occurs in all power supply having an internal impedance. The higher the internal impedance of the electric power source, the more pronounced the malfunction becomes.

SUMMARY OF THE INVENTION

Accordingly, an object of the present invention is to provide an output control device for an electric power source for preventing the electric power source from malfunctioning due to a sharp drop in an input current from the electric power source having a relatively high internal impedance to protect the electric power source, and maintaining a connected load at a stable operation.

According to one aspect of the present invention, an output control device for an electric power source, includes a converter circuit for converting an input voltage from the electric power source to an output voltage, and an input detector circuit for detecting an input from the electric power source, wherein the converter circuit has a lower limit value sustaining mode under which the lower limit value of the input voltage is maintained at a predetermined value in response to the output voltage of the input detector circuit.

Preferably, the input detector circuit detects at least one of an input voltage, an input current, and an input power to the output control device from the electric power source. Preferably, the lower limit value of the input voltage is maintained at the predetermined value by varying the output voltage in the lower limit value sustaining mode.

Preferably, an output current to a load is heightened by maintaining the lower limit value of the input voltage at the predetermined value in the lower limit value sustaining mode.

Preferably, the converter circuit further has a constant voltage control mode for controlling the output voltage to a constant value by detecting the output voltage, and the converter circuit switches between the constant voltage control mode and the lower limit value sustaining mode in response to the detected output of the input detector circuit.

According to another aspect of the present invention, an output control device for an electric power source, includes a converter circuit for converting an input voltage from the electric power source to an output voltage, and an input detector circuit for detecting a variation in an input from the electric power source, wherein the converter circuit has a current increasing mode in which an output current is increased while the variation in the input detected by the input detector circuit is maintained within a constant range by varying the output voltage.

Preferably, the input detector circuit detects at least one of a variation in an input voltage, a variation in an input current, and a variation in an input power from the electric power source.

Preferably, the converter circuit has a constant voltage control mode in which the converter circuit detects the output voltage to control the output voltage to a constant value, and the converter circuit switches between the constant voltage control mode and the current increasing mode in response to the detected output from the input detector circuit.

According to yet another aspect of the present invention, an output control device for an electric power source, includes a converter circuit for converting an input voltage from the electric power source to an output voltage, a lower limit detector circuit for outputting a predetermined signal when the input voltage from the electric power source falls below a predetermined threshold value, and an output voltage detector circuit for detecting the output voltage, wherein the converter circuit controls a conversion condition under which the input voltage is converted to the output voltage based on the output voltage detected by the output voltage detector circuit and the output from the lower limit detector circuit.

According to a further aspect of the present invention, an output control device for an electric power source, includes a converter circuit for converting an input voltage from the electric power source to an output voltage, an upper limit detector circuit for outputting a predetermined signal when the input voltage from the electric power source rises above a predetermined threshold value, and an output voltage detector circuit for detecting the output voltage, wherein the converter circuit controls a conversion condition under which the input voltage is converted to the output voltage based on the output voltage detected by the output voltage detector circuit and the output from the upper limit detector circuit.

According to a further aspect of the present invention, an output control device for an electric power source, includes a converter circuit for converting an input voltage from the electric power source to an output voltage, a variation detector circuit for detecting a variation in an input from the electric power source, wherein the converter circuit controls a conversion condition under which the input voltage is converted to the output voltage based on the variation amount detected by the variation amount detector.

Preferably, the variation amount detector circuit detects at least one of a variation in an input voltage, a variation in an input current, and a variation in an input power from the electric power source.

In accordance with preferred embodiments of the present invention, the input detector circuit detects the input voltage, the input current, and the input power from the electric power source, and the converter circuit for converting the input voltage from the electric power source to the output voltage has the lower limit value sustaining mode in which the lower limit value of the input voltage is maintained at the predetermined value in response to the detected output of the input detector circuit. This arrangement prevents the output voltage of the electric power source from dropping below a specified value of the electric power source, thereby avoiding damaging the electric power source. Since sufficient power to drive a load is picked up from the output of the electric power source, operational stability of the load is assured.

In accordance with the preferred embodiments of the present invention, the input detector circuit detects the variations in the input voltage, the input current, and the input power from the electric power source, and the converter circuit for converting the input voltage from the electric power source to the output voltage has the current increasing mode in which the output current is increased while the variation in the input detected by the input detector circuit is maintained within the constant range by varying the output voltage. This arrangement prevents the output voltage of the electric power source from dropping below a specified value of the electric power source, thereby avoiding damaging the electric power source. Since sufficient power to drive a load is picked up from the output of the electric power source, operational stability of the load is assured.

In all of the aforesaid embodiments, any element used in an embodiment can interchangeably be used in another embodiment unless such a replacement is not feasible or causes adverse effect. Further, the present invention can equally be applied to apparatuses and methods.

For purposes of summarizing the invention and the advantages achieved over the related art, certain objects and advantages of the invention have been described above. Of course, it is to be understood that not necessarily all such objects or advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other objects or advantages as may be taught or suggested herein.

Further aspects, features and advantages of this invention will become apparent from the detailed description of the preferred embodiments which follow.

BRIEF DESCRIPTION OF THE DRAWINGS

These and other features of this invention will now be described with reference to the drawings of preferred embodiments which are intended to illustrate and not to limit the invention.

DESCRIPTION OF THE PREFERRED EMBODIMENTS

An output control device for an electric power source in accordance with preferred embodiments of the present invention will now be discussed with reference to the accompanying drawings.

First Preferred Embodiment

Figure 1:
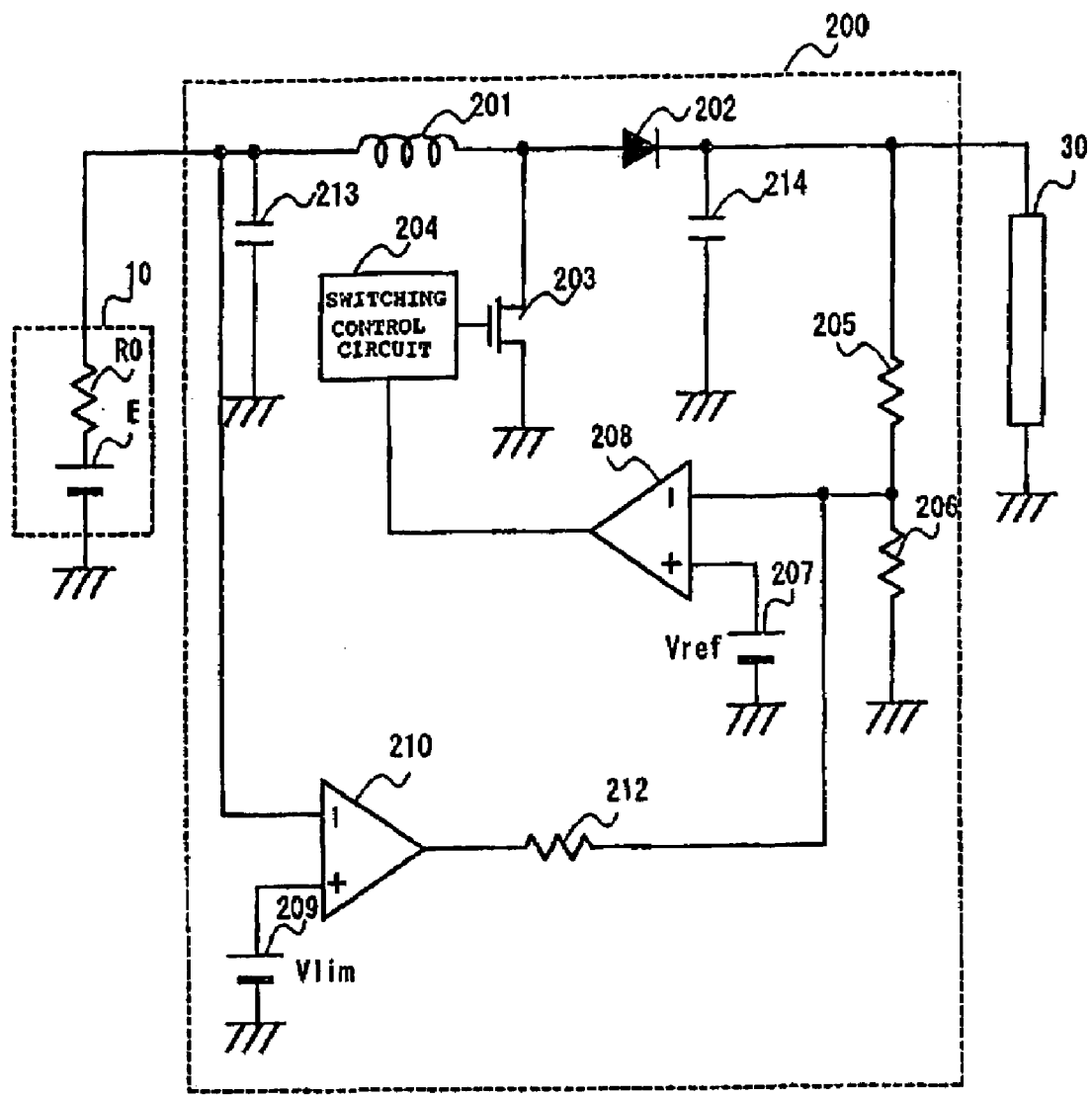
FIG. 1 is a circuit diagram of an output control device of an electric power source in accordance with a first preferred embodiment of the present invention.

FIG. 1 is a circuit diagram of an output control device 200 of an electric power source in accordance with a first preferred embodiment of the present invention.

The output control device 200 supplies power from a fuel cell 10 as an electric power source to a load 30.

The fuel cell 10 includes a power source E having a large internal impedance R0.

The output control device 200 includes a coil 201 receiving the output of the fuel cell 10, a field-effect transistor 203 for switching the output of the coil 201, a diode 202, a pulse-width modulation (PWM) circuit 204 for switch controlling the field-effect transistor 203, resistors 205 and 206 for detecting an output voltage Vout of the output control device 200, a reference voltage generator 207 for generating a reference voltage Vref controlling the PWM circuit 204, a differential amplifier 208 for generating a control signal for controlling the PWM circuit 204, a lower limit value setter 209 for setting a lower limit value Vlim of an input voltage Vin of the output control device 200, a comparator 210 having a negative terminal receiving the input voltage Vin of the output control device 200 and a positive terminal receiving the lower limit value Vlim set by the lower limit value setter 209 to compare the input voltage Vin with the lower limit value Vlim, and resistors 212 for pulling up the output of the comparator 210.

In the output control device 200, the output of the comparator 210 remains at a low level (ground level) when the output voltage of the fuel cell 10, namely, the input voltage Vin of the output control device 200 is above the lower limit value Vlim set by the lower limit value setter 209.

The output voltage Vout of the output control device 200 is voltage divided by a resistor 205 and a parallel circuit of resistors 212 and 206, and the divided voltage V1 is applied to a negative input terminal of the differential amplifier 208.

The differential amplifier 208 then applies a voltage difference between the voltage V1 and a reference voltage Vref to the PWM circuit 204. In response to the voltage difference, the PWM circuit 204 turns on and off the field-effect transistor 203, thereby controlling the output voltage Vout of the output control device 200 to a substantially constant voltage with respect to the reference voltage Vref (constant voltage control mode).

The output of the comparator 210 is transitioned to a high level (Vic=Vout) if the output voltage of the fuel cell 10, namely, the input voltage Vin of the output control device 200 falls to or below the lower limit value Vlim set by the lower limit value setter 209.

The output voltage Vout of the output control device 200 is voltage divided by the resistor 206 and a parallel circuit of resistors 212 and 205, and the divided voltage V2 (>V1) is input to the negative input terminal of the differential amplifier 208.

The differential amplifier 208 applies a voltage difference between the voltage V2 and the reference voltage Vref to the PWM circuit 204. In response to the voltage difference, the PWM circuit 204 turns on and off the field-effect transistor 203, thereby controlling the output voltage Vout of the output control device 200 to a voltage lower than the reference voltage Vref. In this case, the output voltage of the fuel cell 10, namely, the input voltage Vin of the output control device 200 is maintained at the lower limit value Vlim set by the lower limit value setter 209 (lower limit value sustaining mode).

During the lower limit value sustaining mode for maintaining the input voltage Vin of the output control device 200 at the lower limit value Vlim, an output current Iout output from the output control device 200 rises as the output voltage Vout of the output control device 200 falls (current increasing mode).

Figure 2:
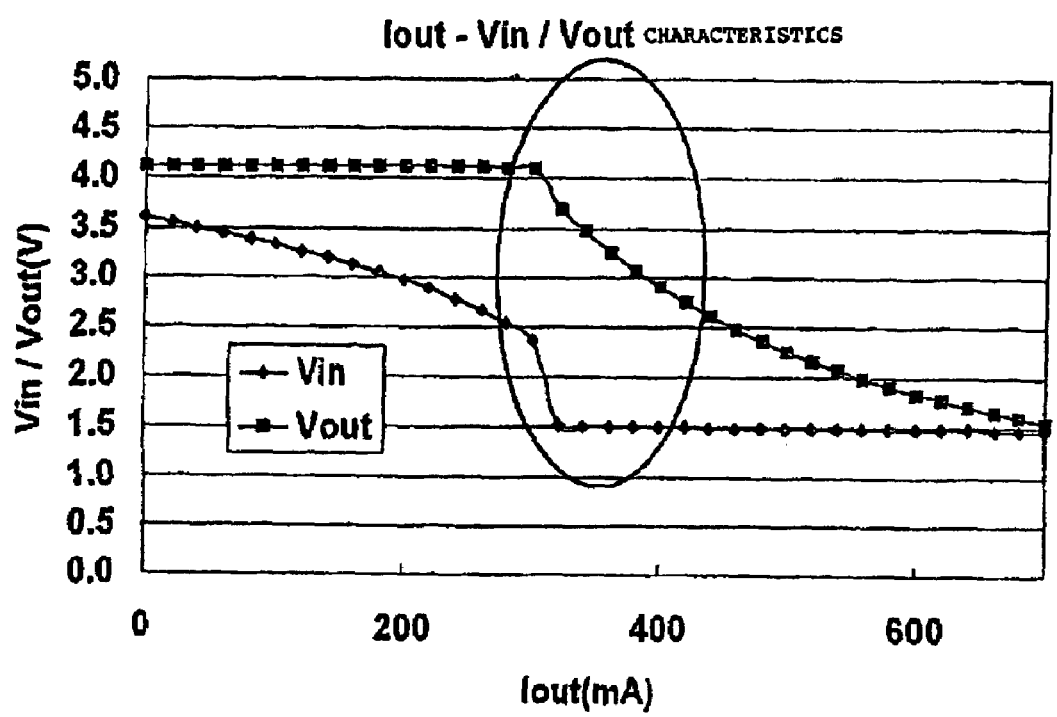
FIG. 2 is a graph plotting output current versus input voltage/output voltage characteristics of the output control device of FIG. 1.

FIG. 2 is a graph plotting output current versus input voltage/output voltage characteristics of the output control device 200 of FIG. 1.

As shown in FIG. 2, when the input voltage Vin of the output control device 200 is higher than the lower limit value Vlim, the output voltage Vout of the output control device 200 is controlled to a substantially constant voltage even if the input voltage Vin of the output control device 200 varies (the constant voltage control model).

However, if the input voltage Vin of the output control device 200 becomes equal to or lower than the lower limit value Vlim, the output voltage Vout of the output control device 200 is controlled to a voltage lower than the substantially constant voltage in the constant voltage control mode. In this case, the input voltage Vin of the output control device 200 is maintained at the lower limit value Vlim (the lower limit value sustaining mode). The output current Iout of the output control device 200 rises as the output voltage Vout of the output control device 200 falls (current increasing mode).

Referring to FIG. 2, the efficiency of the output control device 200 becomes slightly lower in the lower limit value sustaining mode than in the constant voltage control mode, but remains high.

Figure 3:
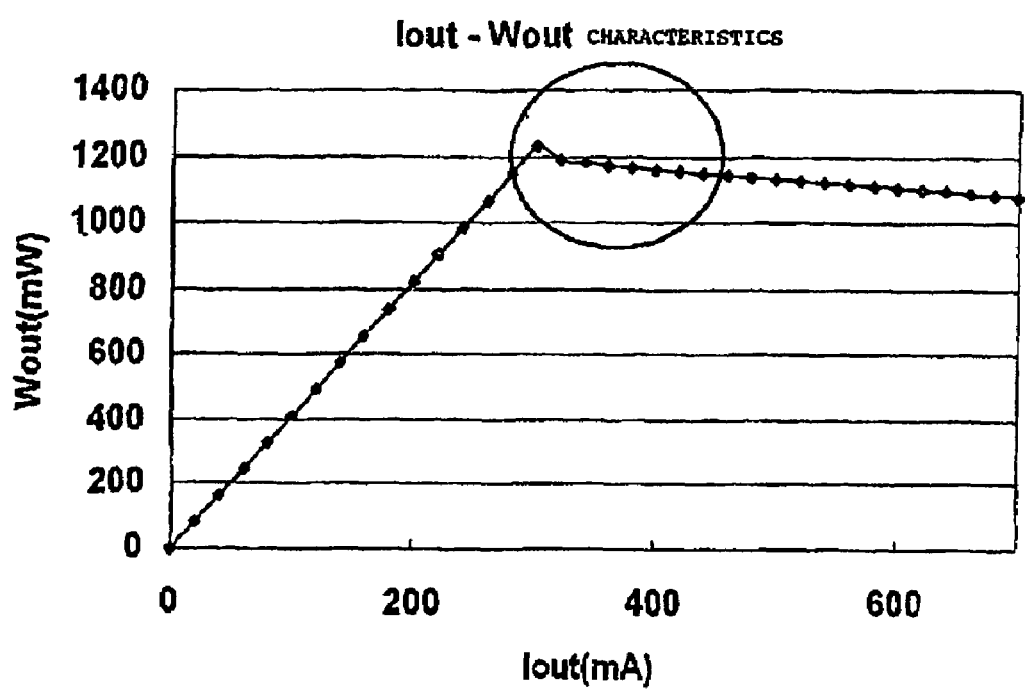
FIG. 3 is a graph plotting output current versus output power characteristics of the output control device of FIG. 1.

FIG. 3 is a graph plotting output current versus output power characteristics of the output control device 200 of FIG. 1.

As shown in FIG. 3, the output control device 200 picks up large power in an area of shift from the constant voltage control mode to the lower limit value sustaining mode (circled regions in FIG. 2 and FIG. 3).

In accordance with the first preferred embodiment of the present invention, the output of the comparator 210 remains at a low level when the input voltage Vin of the output control device 200 is higher than the lower limit value Vlim. In this case, the output voltage Vout of the output control device 200 is controlled to a substantially constant voltage in the constant voltage control mode even if the input voltage Vin of the output control device 200 varies. If the input voltage Vin of the output control device 200 falls to or below the lower limit value Vlim set by the lower limit value setter 209, the output of the comparator 210 is transitioned to a high level. In this case, the output voltage Vout of the output control device 200 is controlled to a low voltage, and the input voltage Vin of the output control device 200 is maintained at the lower limit value Vlim in the lower limit value sustaining mode. During the lower limit value sustaining mode, the output current Iout output from the output control device 200 rises in the current increasing mode as the output voltage Vout of the output control device 200 falls.

In this arrangement, the output voltage of the fuel cell 10 is prevented from falling below the specified value thereof. The fuel cell 10 is thus protected from damage. Even if the output voltage Vout of the output control device 200 falls, the output current Iout rises, and sufficient power to drive the load 30 is provided. The load 30 thus operates in a stable manner.

In the arrangement of FIG. 1, the output voltage of the fuel cell 10, namely, the input voltage Vin of the output control device 200 is monitored to switch between the constant voltage control mode and the lower limit value sustaining mode (the current increasing mode) in response to the input voltage Vin of the output control device 200. The output control device 200 may monitor an input current Iin of the output control device 200 instead of an input voltage Vin of the output control device 200. Alternatively, an input power Win of the output control device 200 may be monitored.

Second Preferred Embodiment

Figure 4:
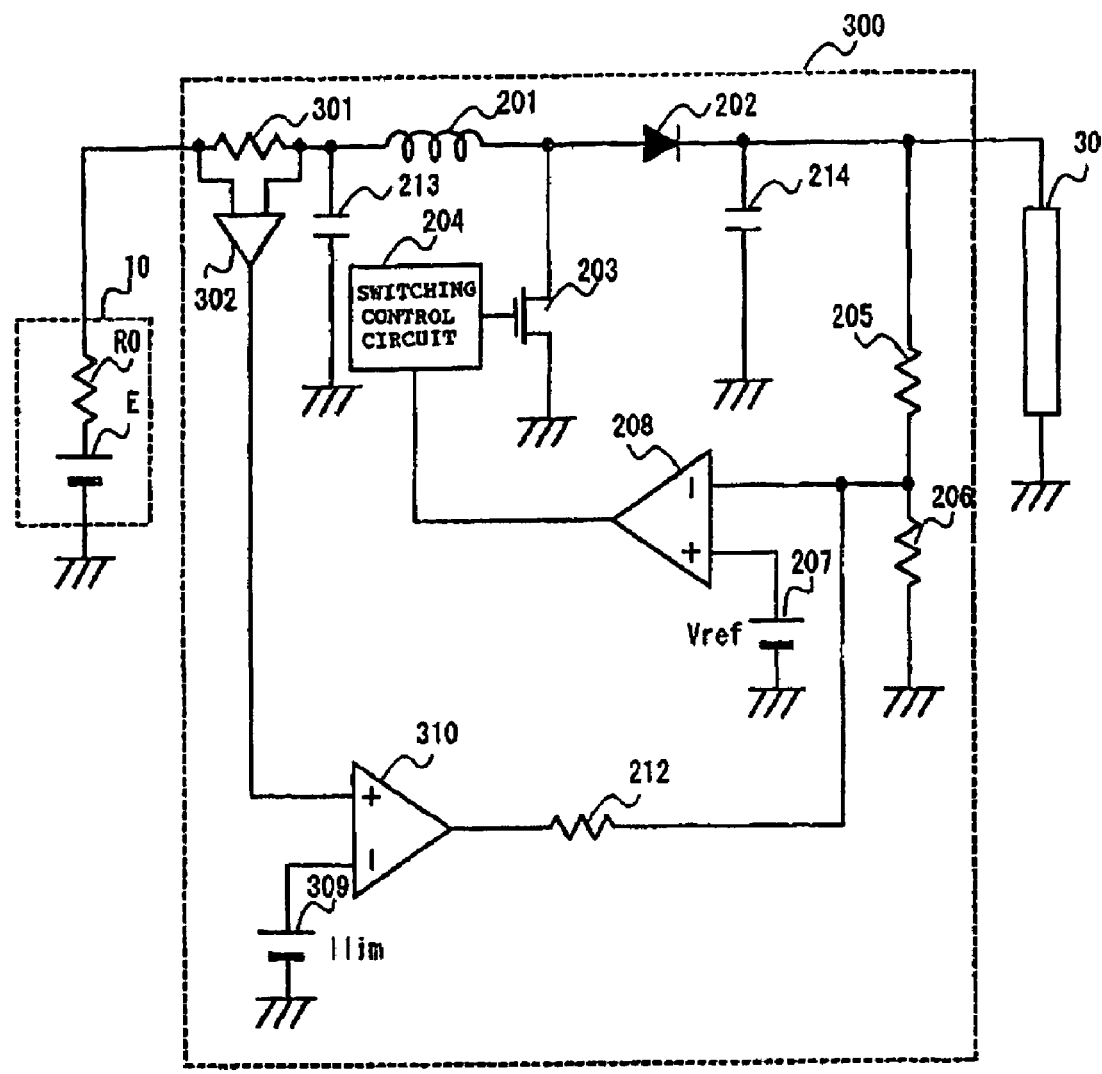
FIG. 4 is a circuit diagram of an output control device of the electric power source in accordance with a second preferred embodiment of the present invention.

FIG. 4 is a circuit diagram of an output control device 300 of the electric power source in accordance with a second preferred embodiment of the present invention.

In accordance with the second preferred embodiment of FIG. 4, the output control device 300 supplies power to a load 30 from a fuel cell 10 as an electric power source. The output control device 300 includes a resistor 301 along an output line of the fuel cell 10. An amplifier 302 detects a voltage drop across the resistor 301, thereby detecting the output current of the fuel cell 10, namely, the input current Iin of the output control device 300.

The input current Iin, detected by the amplifier 302, is supplied to a positive input terminal of a comparator 310. The comparator 310 receives, at the negative input terminal thereof, an upper limit value Ilim of the input current Iin of the output control device 300 set by an upper limit value setter 309. The rest of the structure of the output control device 300 remains identical to the output control device 200. In FIG. 4, elements identical to those described with reference to FIG. 1 are designated with the same reference numerals for convenience of explanation.

In the output control device 300 of FIG. 4, the output of the comparator 310 is at a low level (ground level) when the output current of the fuel cell 10, namely, the input current Iin of the output control device 300 is lower than the upper limit value Ilim set by an upper limit value setter 309.

The output voltage Vout of the output control device 300 is voltage divided by the resistor 205 and a parallel circuit of resistors 212 and 206, and the divided voltage V1 is input to the negative input terminal of the differential amplifier 208.

The differential amplifier 208 supplies the PWM circuit 204 with a voltage difference between the voltage V1 and the reference voltage Vref. In response to the voltage difference, the PWM circuit 204 turns on and off the field-effect transistor 203, thereby controlling the output voltage Vout of the output control device 300 to a substantially constant voltage with respect to the reference voltage Vref (constant voltage control mode).

If the output current of the fuel cell 10, namely, the input current Iin of the output control device 300 rises to or above the upper limit value Ilim set by the upper limit value setter 309, the output of the comparator 310 is transitioned to a high level (Vcc=Vout).

The output voltage Vout of the output control device 300 is voltage divided by the resistor 206 and the parallel circuit of resistors 212 and 205, and the divided voltage V2 (>V1) is fed to the negative input terminal of the differential amplifier 208.

The differential amplifier 208 supplies the PWM circuit 204 with a voltage difference between the voltage V2 and the reference voltage Vref. In response to the voltage difference, the PWM circuit 204 turns on and off the field-effect transistor 203, thereby controlling the output voltage Vout of the output control device 300 to be lower than a voltage corresponding to the reference voltage Vref. In this case, the output current of the fuel cell 10, namely, the input current Iin of the output control device 300 is maintained at the upper limit value Ilim set by the upper limit value setter 309.

The output voltage of the fuel cell 10, namely, the input voltage Vin of the output control device 300 is maintained at the lower limit value Vlim corresponding to the upper limit value Ilim set by the upper limit value setter 309 (lower limit value sustaining mode). The output current Iout output from the output control device 300 rises as the output voltage Vout of the output control device 300 falls (current increasing mode).

In the second preferred embodiment as in the first preferred embodiment of FIG. 1, the output voltage of the fuel cell 10 is prevented from falling below the specified voltage value thereof, and the fuel cell 10 is thus protected from damage. Even if the output voltage Vout of the output control device 300 falls, the output current Iout rises. The output control device 300 picks up sufficient power to drive the load 30 thereby driving the load 30 in a stable manner.

Third Preferred Embodiment

Figure 5:
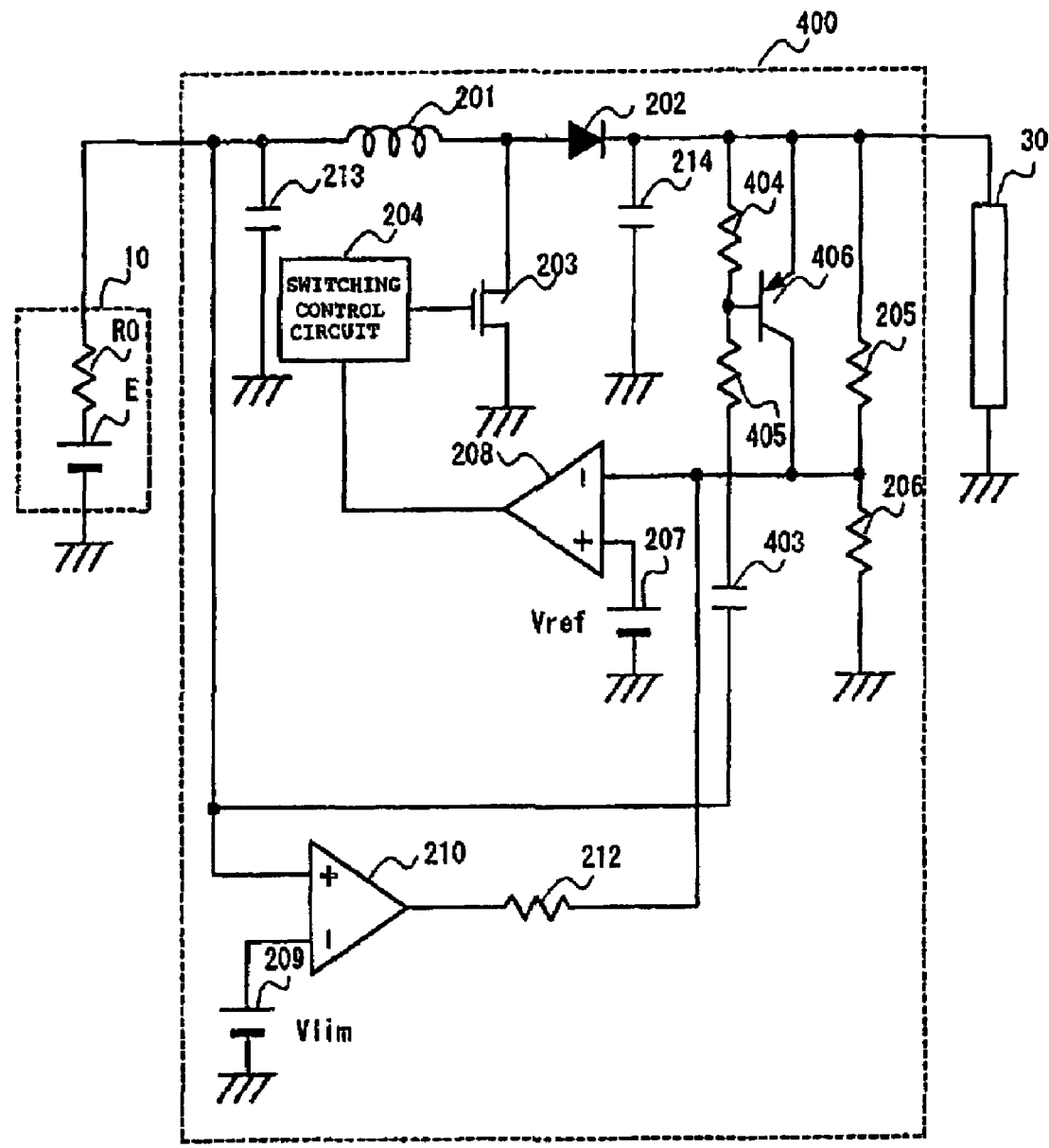
FIG. 5 is a circuit diagram of an output control device of the electric power source in accordance with a third preferred embodiment of the present invention.

FIG. 5 is a circuit diagram of an output control device 400 of the electric power source in accordance with a third preferred embodiment of the present invention.

As shown in FIG. 5, the output control device 400 supplies the load 30 with power from the fuel cell 10 as an electric power source. The output control device 400 monitors a variation ΔV in the output voltage of the fuel cell 10, namely, the input voltage Vin of the output control device 400.

Referring to FIG. 5, a capacitor 213 is connected to the input line from the fuel cell 10 with one terminal and the other terminal thereof grounded. A capacitor 214 is connected to a diode 202 with one terminal thereof connected to the output line of the diode 202 and with the other terminal thereof grounded.

The input line from the fuel cell 10 is connected to the output line of the diode 202 through a capacitor 403, and resistors 405 and 404. A transistor 406 is configured with the base thereof connected to the node of the resistors 405 and 404, with the emitter thereof connected to the output line of the diode 202, and with the collector thereof connected to the negative input terminal of the differential amplifier 208. The rest of the structure of the output control device 400 remains unchanged from the output control device 200 of FIG. 1. In FIG. 5, elements identical to those of the output control device 200 described with reference to FIG. 1 are designated with the same reference numerals for convenience of explanation.

In the output control device 400 of FIG. 5, a variation in the output voltage of the fuel cell 10, namely, a variation $\Delta V$ in the input voltage Vin of the output control device 400 is detected by a circuit of the capacitor 403, and the resistors 405 and 404.

If the variation $\Delta V$ in the input voltage Vin of the output control device 400 is smaller than a value set by the capacitor 403, and the resistors 405 and 404, the transistor 406 remains off. The output voltage Vout of the output control device 400 is controlled to a substantially constant voltage with respect to the reference voltage Vref (constant voltage control mode).

When the input voltage Vin of the output control device 400 falls, and the variation $\Delta V$ becomes equal to or exceeds the value set by the capacitor 403, and the resistors 405 and 404, the transistor 406 operates. The transistor 406 in the operative state thereof practically lowers the impedance of the resistor 205 that detects the output voltage Vout of the output control device 400, thereby heightening the input at the negative input terminal of the differential amplifier 208.

The differential amplifier 208 raises the output thereof, thereby causing the PWM circuit 204 to turn on and off the field-effect transistor 203. A conversion condition for converting the input voltage Vin to the output voltage Vout is thus controlled so that the output voltage Vout of the output control device 400 is set to be lower than a voltage corresponding to the reference voltage Vref. Thereby a drop in the output voltage of the fuel cell 10, namely, a drop in the input voltage Vin of the output control device 400 is controlled not to exceed a specified value (lower limit value sustaining mode).

During the lower limit value sustaining mode for maintaining the input voltage Vin of the output control device 400 at the lower limit value Vlim, the output current Iout of the output control device 400 rises as the output voltage Vout of the output control device 400 falls (current increasing mode).

Figure 6:
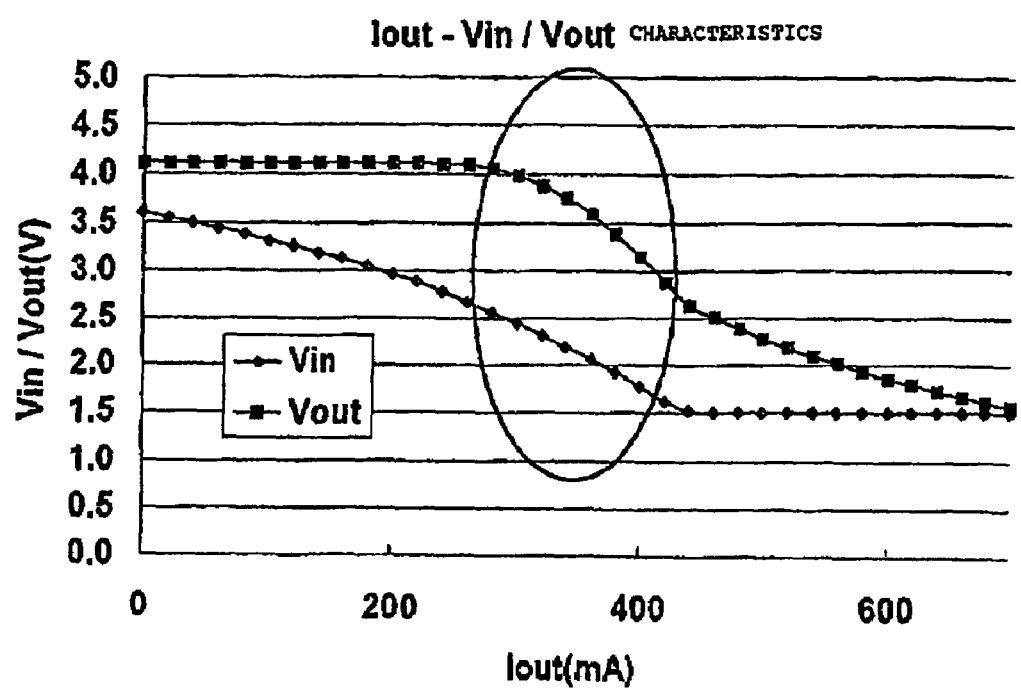
FIG. 6 is a graph plotting output current versus input voltage/output voltage characteristics of the output control device of FIG. 5.

FIG. 6 is a graph plotting output current versus input voltage/output voltage characteristics of the output control device 400 of FIG. 5.

As shown in FIG. 6, if the variation $\Delta V$ in the input voltage Vin of the output control device 400 is not higher than the value set by the capacitor 403 and the resistors 405 and 404, the output voltage Vout of the output control device 400 is controlled to a substantially constant voltage (constant voltage control mode).

When the input voltage Vin of the output control device 400 falls, and the variation $\Delta V$ becomes equal to or exceeds the value set by the capacitor 403 and the resistors 405 and 404, the output voltage Vout of the output control device 400 is controlled to be lower than the constant voltage in the constant voltage control mode. In this case, the drop in the input voltage Vin of the output control device 400 is controlled not to exceed the specified value (lower limit value sustaining mode). The output current Iout of the output control device 400 rises as the output voltage Vout of the output control device 400 falls (current increasing mode).

As shown in FIG. 6, the efficiency of the output control device 400 becomes slightly lower in the lower limit value sustaining mode than in the constant voltage control mode, but remains high.

Figure 7:
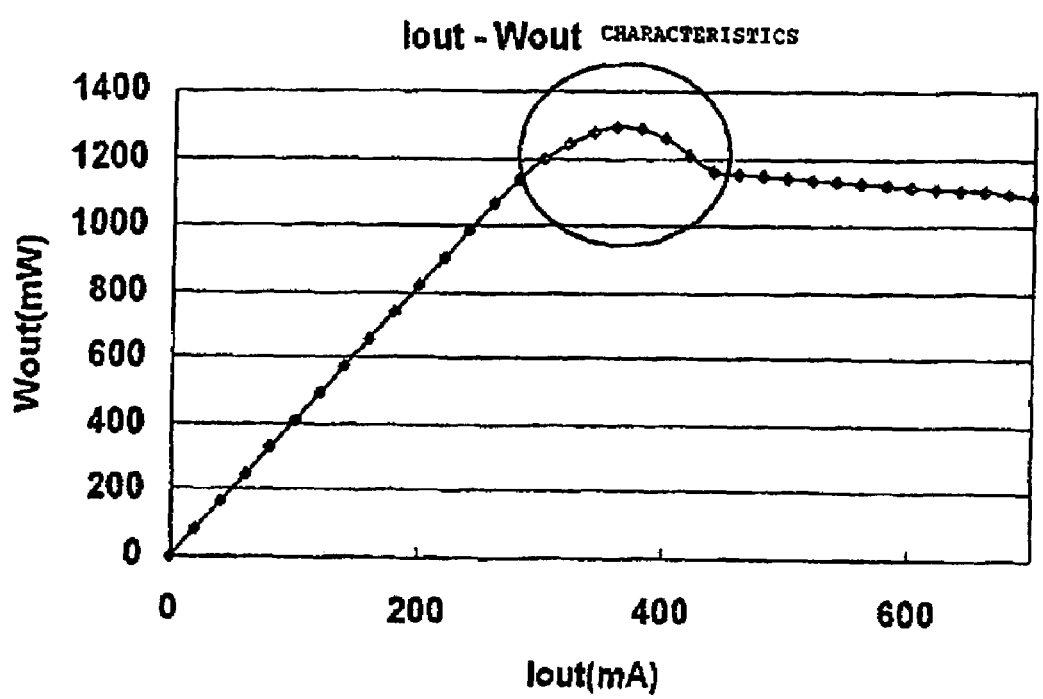
FIG. 7 is a graph plotting output current versus output power characteristics of the output control device of FIG. 5.

FIG. 7 is a graph plotting output current versus output power characteristics of the output control device 400 of FIG. 5.

As shown in FIG. 7, the output control device 400 picks up large power in an area of shift from the constant voltage control mode to the lower limit value sustaining mode (circled regions in FIG. 6 and in FIG. 7).

In accordance with the third preferred embodiment of the present invention, the output voltage of the fuel cell 10 is prevented from falling below the specified value, and the fuel cell 10 is thus protected from damage. Even if the output voltage Vout of the output control device 400 falls, the output current Iout rises, and sufficient power to drive the load 30 is provided. The load 30 thus operates in a stable manner.

The third preferred embodiment of FIG. 5 avoids a sharp change in the output voltage of the fuel cell 10, further protecting the fuel cell 10 from damage.

Fourth Preferred Embodiment

Figure 8:
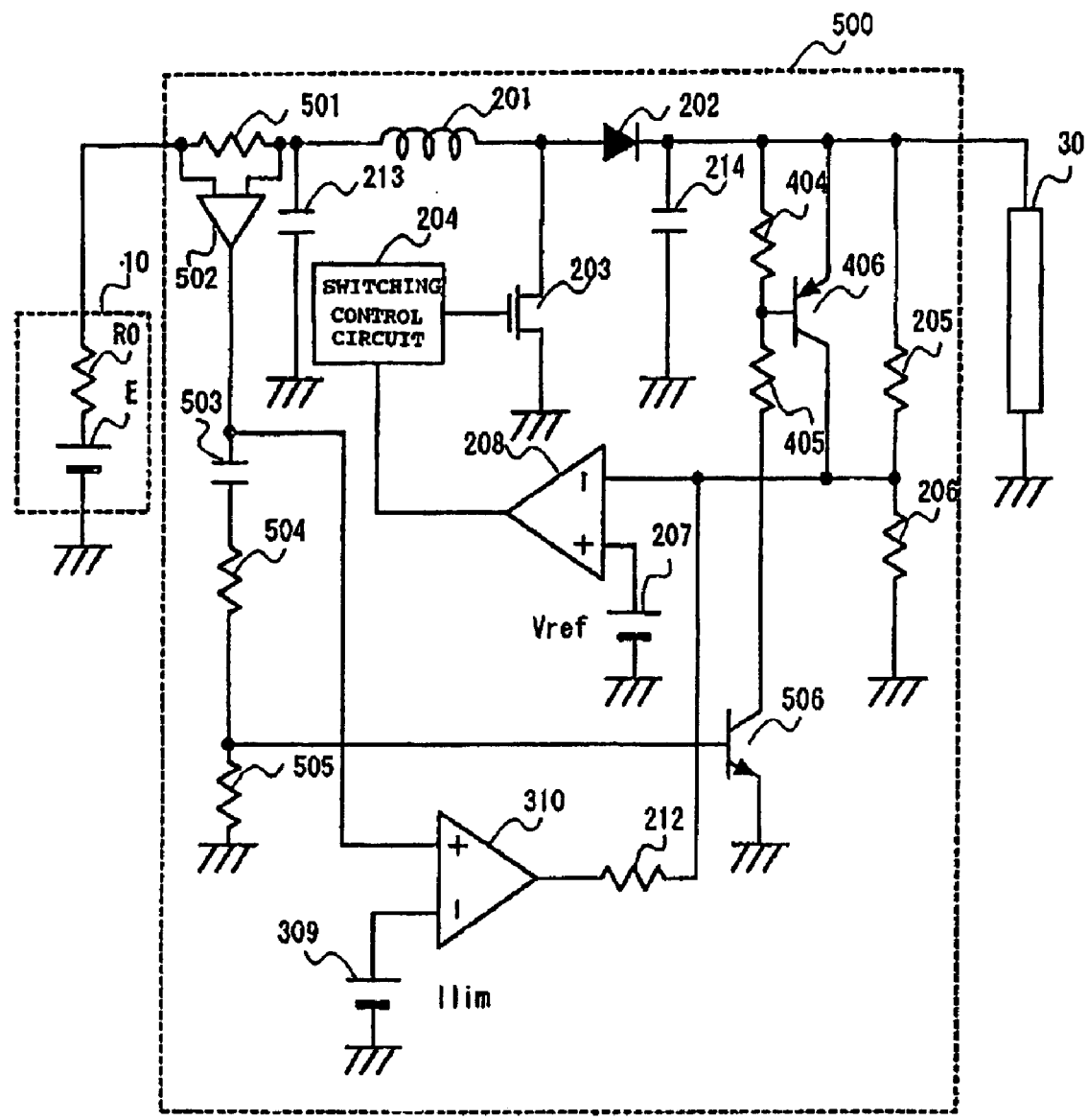
FIG. 8 is a circuit diagram of an output control device of the electric power source in accordance with a fourth preferred embodiment of the present invention.

FIG. 8 is a circuit diagram of an output control device 500 of the electric power source in accordance with a fourth preferred embodiment of the present invention.

As shown in FIG. 8, the output control device 500 supplies the load 30 power from the fuel cell 10 as an electric power source. In the output control device 500, a resistor 501 for detecting a current is arranged along the output line of the fuel cell 10. An amplifier 502 detects a voltage drop across the resistor 501. The output of the amplifier 502 is grounded through a capacitor 503, and resistors 504 and 505. A transistor 506 is configured with the emitter thereof connected to the node of the resistors 504 and 505, with the emitter thereof connected to a resistor 405, and with the collector thereof grounded. In this circuit, a variation $\Delta I$ in the output current of the fuel cell 10, namely, in the input current Iin of the output control device 500 is detected. The rest of the structure of the output control device 500 remains unchanged from the output control device 400 of FIG. 5. As shown in FIG. 8, elements identical in function to those in the output control device 400 of FIG. 5 are designed with the same reference numerals for convenience of explanation.

In the output control device 500, the variation $\Delta I$ in the output voltage of the fuel cell 10, namely, the variation $\Delta I$ in the input current Iin of the output control device 500 is detected by the circuit of the capacitor 503 and the resistors 504 and 505.

If the variation $\Delta I$ in the input current Iin of the output control device 500 is smaller than the value set by the capacitor 503 and the resistors 504 and 505, the transistor 506 remains off. The output voltage Vout of the output control device 500 is controlled to a substantially constant voltage with respect to the reference voltage Vref (constant voltage control mode).

If the input current Iin of the output control device 500 rises, and the variation $\Delta I$ becomes equal to or exceeds the value set by the capacitor 503 and the resistors 504 and 505, the transistor 506 operates, thereby raising the input to the negative input terminal of the differential amplifier 208.

The differential amplifier 208 raises the output thereof, thereby causing the PWM circuit 204 to turn on and off the field-effect transistor 203. A conversion condition for converting the input voltage Vin to the output voltage Vout is thus controlled so that the output voltage Vout of the output control device 500 is set to be lower than a voltage corresponding to the reference voltage Vref, so that a drop in the output voltage of the fuel cell 10, namely, a drop in the input voltage Vin of the output control device 500 is controlled not to exceed a specified value (lower limit value sustaining mode).

During the lower limit value sustainting mode for maintaining the input voltage Vin of the output control device 500 at the lower limit value Vlim, the output current Iout of the output control device 500 rises as the output voltage Vout of the output control device 500 falls (current increasing mode).

In accordance with the fourth preferred embodiment of the present invention, the output voltage of the fuel cell 10 is prevented from falling below the specified value, and the fuel cell 10 is thus protected from damage. Even if the output voltage Vout of the output control device 500 falls, the output current Iout rises, and sufficient power to drive the load 30 is thus provided. The load 30 thus operates in a stable manner.

The fourth preferred embodiment of FIG. 8 avoids a sharp change in the output voltage of the fuel cell 10, further protecting the fuel cell 10 from damage.

The output control devices for the electric power source uses a fuel cell as power source have been discussed. The present invention is applicable to an output control device for an electric power source having a relatively large internal impedance, such as a lithium battery.

The present invention is applicable to the output control device for the electric power source having the relatively large impedance, the output control device including the converter for converting the input voltage from the electric power source to the output voltage. The output control device also includes the input detector circuit for detecting the input voltage, the input current, and the input power from the electric power source, the variation in the input voltage, the variation in the input current, and the variation in the input power from the electric power source. The converter circuit for converting the input voltage from the electric power source to the output voltage has the lower limit value sustaining mode in which the lower limit value of the input voltage is maintained at the predetermined value in response to the detected output of the input detector circuit. The output voltage of the electric power source is thus prevented from falling below the specified value, thereby protecting the electric power source from damage. Since sufficient power to drive the load is picked up from the output of the electric power source, operational stability of the load is assured.

In the above preferred embodiments, the constant voltage control mode is switched to the lower limit value sustaining mode (or the current increasing mode) when the detected values are equal to or lower than, equal to or above, or become equal to or exceed the respective predetermined set values. However, the switching can equally be made when the detected values are lower than, above, or exceed the respective predetermined set values. Further, particular elements used in the preferred embodiments are not intended to restrict the present invention, but simply show examples.

The present application claims priority under 35 U.S.C. 119 to Japanese Patent Application No. 2003-312791, filed Sep. 4, 2003, the disclosure of which is incorporated herein by reference in its entirety.

It will be understood by those of skill in the art that numerous and various modifications can be made without departing from the spirit of the present invention. Therefore, it should be clearly understood that the forms of the present invention are illustrative only and are not intended to limit the scope of the present invention.

What is claimed is:

1. An output control device for an electric power source, comprising:

a converter circuit for converting an input voltage from the electric power source to an output voltage; and an input detector circuit for detecting, monitoring, and comparing with a reference value an input from the electric power source, wherein the converter circuit has a constant voltage control mode under which the output voltage is maintained, and a lower limit value sustaining mode under which a lower limit value of the input voltage is maintained at a predetermined voltage value, said lower limit value sustaining mode being activated when an output from the input detector circuit is compared with and is lower than a predetermined set reference value.

2. An output control device according to claim 1, wherein the input detector circuit detects at least one of an input voltage, an input current, and an input power to the output control device from the electric power source.

3. An output control device according to claim 1, wherein the lower limit value of the input voltage is maintained at the predetermined value by varying the output voltage in the lower limit value sustaining mode.

4. An output control device according to claim 1, wherein an output current to a load is heightened by maintaining the lower limit value of the input voltage at the predetermined value in the lower limit value sustaining mode.

5. An output control device according to claim 1, wherein the converter circuit further has a constant voltage control mode for controlling the output voltage to a constant value by detecting the output voltage, and wherein the converter circuit switches between the constant voltage control mode and the lower limit value sustaining mode in response to the detected output of the input detector circuit.

6. An output control device for an electric power source, comprising a converter circuit for converting an input voltage from the electric power source to an output voltage; and an input detector circuit for monitoring and detecting a variation in an input from the electric power source, wherein the converter circuit has a constant voltage control mode under which the output voltage is maintained, and a current increasing mode in which an output current is increased while the input voltage is maintained at a predetermined value, said current increasing mode being activated when the variation in the input detected by the input detector circuit is compared with and exceeds a predetermined value.

7. An output control device according to claim 6, wherein the input detector circuit detects at least one of a variation in an input voltage, a variation in an input current, and a variation in an input power from the electric power source.

8. An output control device according to claim 6, wherein the converter circuit has a constant voltage control mode in which the converter circuit detects the output voltage to control the output voltage to a constant value, and wherein the converter circuit switches between the constant voltage control mode and the current increasing mode in response to the detected output from the input detector circuit.

9. An output control device for an electric power source, comprising
- a converter circuit for converting an input voltage from the electric power source to an output voltage;
- a lower limit detector circuit for monitoring the input voltage from the electric power source and outputting a predetermined signal when the input voltage from the electric power source falls below a predetermined threshold value; and
- an output voltage detector circuit for detecting the output voltage,
- wherein the converter circuit controls a conversion condition under which the input voltage is converted to the output voltage based on the output voltage detected by the output voltage detector circuit and the output from the lower limit detector circuit.

10. An output control device for an electric power source, comprising
- a converter circuit for converting an input voltage from the electric power source to an output voltage;
- an upper limit detector circuit for monitoring an input current from the electric power source and outputting a predetermined signal when the input current from the electric power source rises above a predetermined threshold value; and
- an output voltage detector circuit for detecting the output voltage,
- wherein the converter circuit controls a conversion condition under which the input voltage is converted to the output voltage based on the output voltage detected by the output voltage detector circuit and the output from the upper limit detector circuit.

11. An output control device for an electric power source, comprising:
- a converter circuit for converting an input voltage from the electric power source to an output voltage, said converter circuit comprising a switching controller controlling the output voltage at a substantially constant value by inputting therein a set reference voltage and a signal indicative of the output voltage in a constant voltage control mode; and
- an input detector circuit for detecting an input indicative of a change of the input voltage from the electric power source, said input detector circuit maintaining the input voltage at a predetermined value with reference to a set lower limit value of voltage and the detected input in a lower limit value sustaining mode,
- wherein the switching controller receives an output from the input detector and controls the output voltage at a value lower than the reference voltage when in the lower limit sustaining mode.

12. An output control device according to claim 11, wherein the detected input is selected from the group consisting of an input voltage, an input current, an input power, a variation of the input voltage, a variation of the input current, and a variation of the input power from the electric power source.

13. An output control device according to claim 12, wherein the switching controller comprises:
- a differential amplifier which compares the reference voltage and a signal indicative of the output voltage modified by the output from the input detector to output a voltage difference; and
- a switching control circuit and a filed-effect transistor, said switching control circuit turning on and off the field-effect transistor in response to the voltage difference to control the output voltage from the output control device.

14. An output control device according to claim 13, wherein the input detector is configured to detect the input voltage from the electric power source and compare the input voltage and the lower limit value of voltage.

15. An output control device according to claim 13, wherein the input detector is configured to detect the input current from the electric power source and compare the input current and an upper limit value of current corresponding to the lower limit value of voltage.

16. An output control device according to claim 13, wherein the input detector is configured to detect the input voltage and a variation of the input voltage from the electric power source, compare the input voltage and the lower limit value of voltage, and compare the variation of the input voltage and a set variation of the input voltage.

17. An output control device according to claim 13, wherein the input detector is configured to detect the input current and a variation of the input current from the electric power source, compare the input current and an upper limit value of current corresponding to the lower limit value of voltage, and compare the variation of the input current and a set variation of the input current.

18. An output control device according to claim 11, wherein the converter circuit is configured to boost the input voltage to the output voltage.

19. An output control device for an electric power source, comprising:
- a converter circuit for converting an input voltage from the electric power source to an output voltage; and
- an input detector circuit for detecting, monitoring, and comparing with a reference value an input from the electric power source, said input detector circuit including a comparator which receives the input from the electric power,
- wherein the converter circuit has a constant voltage control mode under which the output voltage is maintained, and a lower limit value sustaining mode under which a lower limit value of the input voltage is maintained at a predetermined voltage value, said lower limit value sustaining mode being activated when an output from the comparator of the input detector circuit is compared with and is lower than a predetermined set reference value.

* * * * *